United States Patent [19]

Vecchiotti et al.

[11] 4,125,424
[45] Nov. 14, 1978

[54] APPARATUS FOR FABRICATING BATTERY PLATE SLEEVES

[75] Inventors: Camillo M. Vecchiotti, Ridgewood; Raymond P. Meenen, Hawthorne, both of N.J.

[73] Assignee: Amerace Corporation, New York, N.Y.

[21] Appl. No.: 793,482

[22] Filed: May 4, 1977

[51] Int. Cl.$^2$ .................. B30B 15/34; B32B 31/04
[52] U.S. Cl. .................. 156/550; 156/510; 156/554; 156/555; 156/583; 198/835; 425/371; 429/139; 429/247
[58] Field of Search .......... 156/353, 510, 549, 550, 156/551, 554, 555, 107, 176, 269, 302, 547, 583, 324; 83/347; 425/371; 198/817, 834, 835; 136/201; 429/131, 133, 139, 247, 254; 29/623.3, 623.4

[56] References Cited

U.S. PATENT DOCUMENTS

| 448,063 | 3/1891 | McCoy | 156/551 |
|---|---|---|---|
| 1,504,218 | 8/1924 | Crowell | 156/551 |
| 1,606,307 | 11/1926 | Loomis et al. | 156/550 |
| 2,291,955 | 8/1942 | Emmey | 156/549 |
| 2,715,934 | 8/1955 | Sabee et al. | 156/555 |
| 2,980,159 | 4/1961 | Greene | 156/549 |
| 3,229,620 | 1/1966 | Rogers et al. | 156/555 |
| 3,304,825 | 2/1967 | Preusser | 156/353 |
| 3,312,594 | 4/1967 | Newcomb | 156/550 |
| 3,431,594 | 3/1969 | Schenck et al. | 425/371 |
| 3,455,770 | 7/1969 | Dahl, Jr. | 156/549 |
| 3,526,562 | 9/1970 | Dahl, Jr. | 156/519 |
| 3,730,810 | 5/1973 | Klein | 156/353 |
| 3,739,675 | 6/1973 | Duckett et al. | 83/347 X |
| 3,962,021 | 6/1976 | Weisfeld | 156/555 X |
| 3,980,174 | 9/1976 | Conrad | 198/835 |

*Primary Examiner*—Michael G. Wityshyn
*Attorney, Agent, or Firm*—S. Michael Bender

[57] ABSTRACT

An apparatus for the fabrication of battery separator sleeves in which two sheets of microporous plastic material are bonded to intermediately-disposed sealing strips by solvent welding or solvent adhesive bonding. Dispensers continuously apply solvent or solvent adhesive to the interfaces between continuous lengths of parallel, superposed sheet material and two, continuous lengths of sealing strips disposed between and along the lateral edges of the sheet materials. Bonding is achieved by subjecting the assembled materials to pressure applied by a series of pressure rollers and to heat applied to the lateral edges of the sheet materials by heating elements. The continuous length of formed battery separator sleeve is cut to the appropriate length.

26 Claims, 4 Drawing Figures

APPARATUS FOR FABRICATING BATTERY PLATE SLEEVES

BACKGROUND OF THE INVENTION

This invention relates generally to a battery separator and, more particularly, to an apparatus for fabricating a battery separator from two sheets of microporous plastic material adhered together by two strips of polyvinyl chloride material to form a sleeve.

It is known that wet cell-type batteries employ at least one pair of opposite-polarity, planar electrodes, commonly called plates, which are closely spaced in a parallel relationship and immersed in a liquid electrolyte to form an electrochemical couple. Many wet cell-type batteries employ a plurality of pairs of the opposite-polarity plates, with the plates being normally arranged in an upstanding, face-to-face configuration. The exact number of pairs of plates in a particular battery depend upon the capacity and/or voltage desired.

In order to prevent adjacent, opposite-polarity plates from coming into direct physical contact, and thereby causing arcing and/or short circuiting, it is necessary to electrically insulate the adjacent plates from each other. Electrically insulative material, usually in sheet form and similar in size to the plates, and commonly referred to as separators, have been positioned between the opposite-polarity plates, with the insulative material being permeable or semi-permeable to the liquid electrolyte to maintain the ionic conduction required for the battery action.

In the prior art, separators have been fabricated of rubber, wood and glass. More recent designs have used microporous material, including polyethylene, vinyl resin, and the like, which have excellent insulating capabilities, yet are relatively low in weight and cost. An example of such a plastic separator is disclosed in U.S. Pat. No. 3,696,061, issued Oct. 3, 1972, in the name of Selsor et al, and assigned to the same assignee as the present application.

In applications where heavy-duty use and requirements are such that maximum insulation between the positive and negative plates must be provided, such as in the case of industrial batteries, it has been found advantageous to place a sleeve of insulating material upon either the positive or the negative plates, with the sleeve being formed and folded to the dimensions of the plate. In a typical insulating-sleeve configuration, one side is formed by the end portions of the sleeve which are overlapped and sealed, so that the sleeve has completely insulating sides to prevent the formation of lead dendrites from the negative to the positive plates when the battery is charging and discharging in service.

Although battery separators of a plastic material of the general type disclosed above, and as specifically disclosed in the aforementioned Selsor et al patent, have enjoyed widespread commercial success, especially for use in industrial type batteries, such separators are relatively brittle and therefore special means are required to fold the material into the desired sleeve configuration without fracturing or breaking the material. For example, in the commonly-assigned U.S. Pat. No. 4,002,417, issued Jan. 11, 1977, there is disclosed a relatively complex and relatively expensive apparatus for folding such separator material to form sleeves or envelopes without causing fracture or breakage of the material.

In U.S. patent application Ser. No. 726,264, filed Sept. 24, 1976, now U.S. Pat. No. 4,086,119 and assigned to the same assignee as the present application, a method is disclosed for forming a sleeve-type battery separator without the need for folding the separator material. This method has proven to be relatively successful, and underscores the need for a simple machine for fabricating a battery separator of this type without folding of the separator material.

SUMMARY OF THE INVENTION

Accordingly, it is an object of the present invention to provide an apparatus for fabricating a battery separator having a sleeve-like configuration without the need for folding the separator material.

It is another object of the present invention to provide an apparatus for fabricating a battery separator of the above type which is formed by two sheets of microporous plastic material having intermediate strips of polyvinyl chloride material adhered thereto to form a sleeve.

It is another object of the present invention to provide an apparatus for fabricating a battery separator of the above type by the continuous solvent bonding of sealing strips of plastic material to two sheets of microporous plastic material.

It is a further object of the present invention to provide an apparatus for fabricating a battery separator of the above type in which the operation of the apparatus is semi-automatically controlled.

Toward the fulfillment of these and other objects, the battery separator fabricating apparatus of the present invention comprises a first supply source of a continuous sheet of microporous plastic material directed to a first set of pressure rollers, and sources of two strips of sealing material which are passed over respective positioning rollers which properly orient each strip relative to the lateral edge of the first sheet of microporous plastic material. Bonding material is injected into the interfaces between the two strips of material and the sheet of microporous plastic material, and the assembled elements are passed through the first set of pressure rollers which initiates the bonding action of the solvent. A second sheet of microporous plastic material is positioned over the sealing strips in superposed configuration relative to the first sheet of microporous material. Bonding material is injected into the interfaces between the second sheet of microporous material and the upper surfaces of the sealing strips. The assembled battery separator sleeve is subsequently passed through a second set of pressure rollers to initiate the bonding of the second sheet of microporous material, and between a series of heater elements which complete the bonding action and evaporate the excess solvent. The continuous, fabricated battery separator sleeve is cut to proper length. A variable-speed motor drives the fabricating apparatus and synchronizes the operation of the components.

DESCRIPTION OF THE PREFERRED EMBODIMENT

Figure 1:
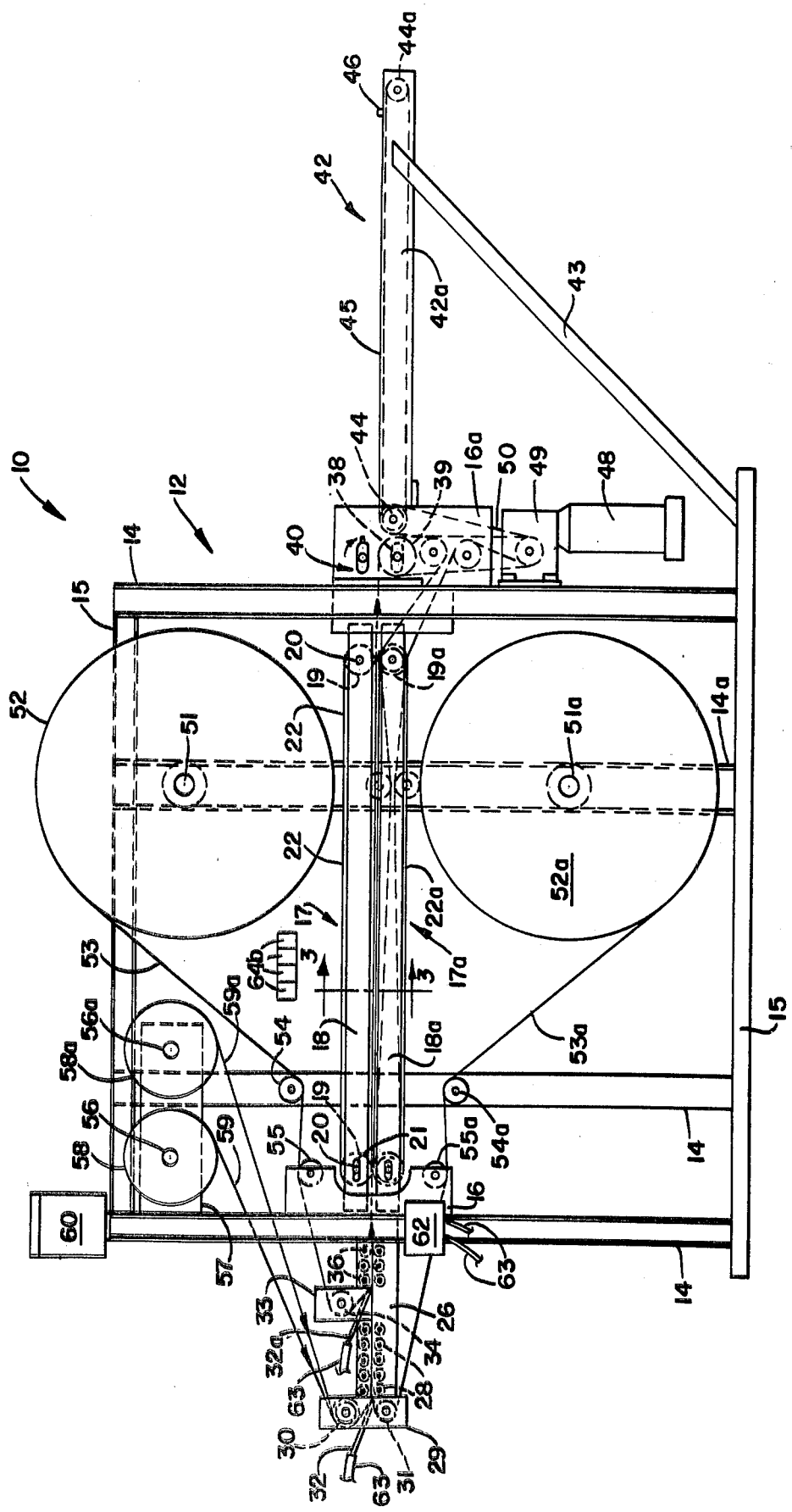
FIG. 1 is a side, elevational view of the fabricating apparatus of the present invention utilized in forming battery separator sleeves.
Figure 2:
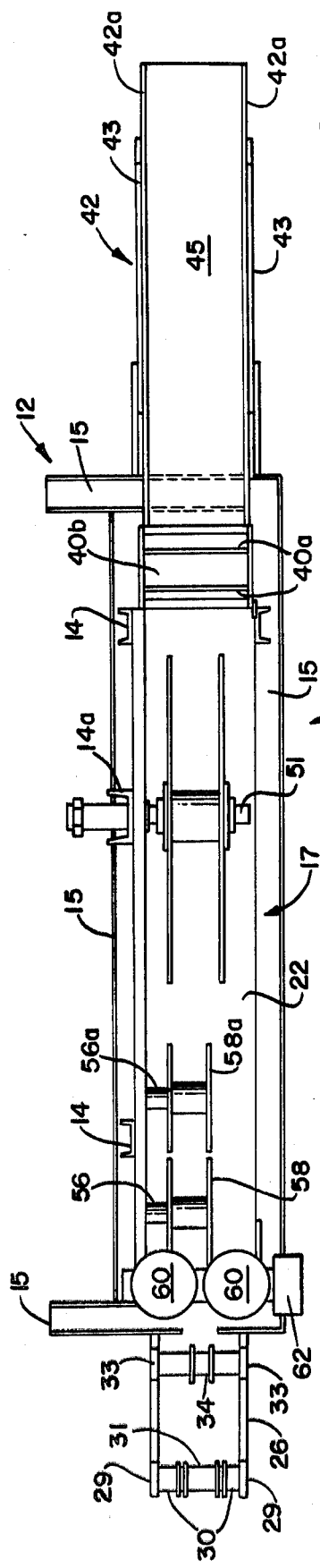
FIG. 2 is a plan view of the apparatus shown in FIG. 1.

Referring specifically to FIGS. 1 and 2 of the drawings, the reference numeral 10 refers in general to a battery separator sleeve fabrication apparatus, which includes a frame assembly 12 having a plurality of vertical support members 14 and 14a appropriately joined at their upper and lower extremities to a plurality of horizontally-disposed support members 15 to form a rigid, stable structure upon which the components of the fabrication apparatus are supported. The vertical support member 14a is of a greater load-carrying capacity than the other vertical members 14, and is provided to support the supply of materials used in the fabrication of the battery separator sleeves, as will be described more fully below.

In the orientation of FIGS. 1 and 2, two pairs of support brackets 16 and 16a, one of each pair being visible in FIG. 1, are attached to pairs of vertical support members 14 disposed, respectively, at the left and right ends of the frame assembly 12. While not specifically shown in the drawings, the second of the pairs of support brackets 16 and 16a are disposed directly behind the respective brackets shown in FIG. 1. An upper belt assembly 17 and a lower belt assembly 17a are supported on the pairs of brackets 16 and 16a. The upper belt assembly 17 includes an elongated, rectangular-shaped belt frame 18, which is pivotally supported at one end on the pair of brackets 16 and releasably secured at the other end on the second pair of support brackets 16a. A roller 19 is supported for rotation at each end of the belt frame 18 by roller bearings 20, with the roller bearing at the pivoted end of the belt frame 18 being slidably fitted within an elongated slot 21 provided on the belt frame to permit adjustment of the belt tension. Tracked over the rollers 19 is an endless belt 22. The lower belt assembly 17a, is of identical construction as the upper belt assembly 17, except that the lower belt assembly is not pivotally mounted. The pivotal mounting of the belt frame 18 at one end, such as at the left end in FIG. 1, permits the upper belt assembly 17 to be adjusted vertically to vary the spacing between the belts of the belt assemblies 17 and 17a.

A horizontal platform 26 extends beyond the left set of vertical support members 14 of the frame assembly 12, and is in substantial vertical alignment with the horizontal interface between the upper and lower belt assemblies 17 and 17a. A plurality of pairs of pressure rollers 28 are supported adjacent to the left end portion of the platform 26, and a vertical support plate 29 is secured to each lateral edge of the platform, at the left end of the platform. Each pair of pressure rollers 28 has vertically-positioned rollers, which are fixedly attached to rotatable driving gears (not shown) and which are vertically adjustable to vary the spacing therebetween. A pair of grooved guide rollers 30 (FIG. 2) are supported for rotation by the vertical support plates 29, with each of the guide rollers 30 being positioned adjacent to the upper portion of each of the vertical support plates (FIG. 1). Disposed in vertical alignment, and below the axis of rotation of the grooved guide rollers 30, and substantially along the longitudinal centerline of the horizontal platform 26, is a guide roller 31, which is appropriately journalled to the lower portion of the vertical support plates 29 for free rotation. Also appropriately supported by the horizontal platform 26 are first and second pairs 32 and 32a, respectively, of solvent dispensers (one of each pair being shown in FIG. 1) which may be of needletype configurations with the dispensing ends thereof ground into planes, for purposes which will be described more fully below.

Positioned to the right of the vertical support plates 29, in the orientation of FIGS. 1 and 2, is a second pair of vertical plates 33, one being secured to each lateral edge of the horizontal platform 26. Supported for rotation by the vertical plates 33 is a second guide roller 34, which is positioned above the plane of the horizontal platform 26 and substantially in alignment with the longitudinal centerline of the platform. A second set of pressure rollers 36, similar in construction to the pressure rollers 28, is supported by the horizontal platform 26 and positioned to the right of the vertical plates 33.

At the other end of the frame assembly 12, the right end as seen in FIGS. 1 and 2, a rotary cutter bed 38 is rotatably supported at its ends by the pair of support brackets 16a. The upper surface of the rotary cutter bed 38 is in horizontal alignment with the upper surface of the belt 22a of the lower belt assembly 17a. Rotation of the cutter bed 38 is controlled by a sprocket wheel 39, which is coaxially journalled with the cutter bed and is rotated by a drive chain, as discussed more fully below. Vertically disposed above the upper surface of the rotary cutter bed 38, and also rotatably supported by the pair of support brackets 16a, is a rotary cutter 40, which may be of known construction and includes a plurality of cutting elements 40a disposed on the circumference of a rotatable supporting core 40b. Rotation of the cutter 40 is synchronized with the rotation of the cutter bed 38 to shear the formed battery separator sleeve passing between these elements. The rotary cutter bed 38 is provided with one or more replaceable pads (not shown) of a suitable material, such as brass, upon which the cutting elements 40a of the rotary cutter 40 impact to effect the shearing action.

Extending to the right of the pair of support brackets 16a is an extension frame 42, formed by a pair of parallel, horizontally-disposed frame plates 42a. One end of each of the frame plates 42a is supported upon the brackets 16a, and the other end is supported by an angled support brace 43. Rollers 44 and 44a are supported for rotation at respective ends of the frame plates 42a, and an endless belt 45 is trained over these rollers. The upper surface of the belt 45 is disposed in horizontal alignment with the upper surface of the rotary cutter bed 38 and the upper surface of the lower belt assembly 17a. Slidably positioned on the extension frame 42 is a microswitch 46 of known construction, which controls the activation of the rotary cutter bed 38 and the rotary cutter 40. The position of the microswitch 46 along the length of the extension frame 42 may be adjusted, depending upon the speed with which the battery separator fabrication apparatus 10 is operated, so that the rotary cutter 40 is actuated at the proper time to cut the formed battery separator sleeve into proper lengths.

A variable-speed motor 48 is supported by a bracket 49, which is secured to one of the vertical support members 14, and is positioned below the horizontal plane defined by the lower belt assembly 17a, the rotary cutter bed 38 and the upper surface of the belt 45. Coupled to the variablespeed motor 48 is an continuous drive chain 50, which passes over and meshes with a series of properly-positioned gears (not shown) associated with the sets of pressure rollers 28 and 36 and sprocket wheels (shown by the broken lines in FIG. 1) to drive in synchronous motion the sets of pressure rollers, the upper and lower belt assemblies 17 and 17a, the rotary cutter bed 38 and the rotary cutter 40, and the belt 45.

Disposed on the upper and lower portions of the vertical support member 14a is an upper and a lower shaft 51 and 51a, respectively. Supported, respectively, for rotation on the upper and lower shafts 51 and 51a is a supply roll 52 and 52a, upon which is wound a length of microporous plastic material, such as polyvinyl chloride (PVC) in sheet form, indicated as 53 and 53a, respectively, which has been cut to the proper width. The microporous plastic material 53 from the upper supply roll 52 is threaded over a set of guide rollers 54 and 55, which are respectively supported on one of the vertical support members 14 and the support bracket 16, threaded over the guide roller 34 supported on the vertical plates 33, and placed between the upper and lower pressure rollers of the second set of pressure rollers 36. Similarly, the microporous plastic material 53a from the lower supply roll 52a is passed over a series of guide rollers 54a and 55a, which are respectively positioned in vertical alignment with the guide rollers 54 and 55, but are disposed below the horizontal plane defined by the upper surface of the lower belt assembly 17a. The microporous plastic material 53a is then passed over the guide roller 31 supported by the vertical support plates 29, and placed between the vertically-positioned rollers of the first set of pressure rollers 28.

A pair of horizontally-aligned spindles 56 and 56a are attached to a plate 57, which is secured adjacent to the upper, left portion of the frame assembly 12 (FIG. 1). Respectively mounted for rotation on the spindles 56 and 56a are supply spools 58 and 58a, upon which are wound lengths of plastic sealing strips 59 and 59a, respectively, which may be extruded PVC strips. The plastic sealing strips 59 and 59a are passed over the grooved guide rollers 30 supported on the vertical support plates 29. The grooved guide rollers 30 function to turn the strips of sealing material 90° from the orientation of the material as it leaves the supply spools 58 and 58a, and also to correctly position the strips, after they have been turned, relative to the edges of the microporous plastic material 53a passing over the guide roller 31. Thus, the grooved guide rollers 30 and the guide roller 31 cooperate to position each of the plastic sealing strips 59 and 59a properly along the lateral edges of the microporous plastic material 53a after the latter has passed over the guide roller 31.

The microporous PVC sheet material, such as that marketed by the Amerace Esna Corporation under the trademark of "Amer-Sil", may be cut to the proper width, such as 146 mm. or 188 mm., and wound on the supply spools 52 and 52a in the fashion described above, to produce supply spools approximately one meter in diameter. Extruded PVC sealing strips approximately 4.8 mm. wide by 2.2 mm. thick are wound on supply spools 58 and 58a, which have a diameter of approximately 304 mm. (12 inches).

Supported on the upper portion of the frame assembly 12, and to the left side thereof, is a pair of covered solvent tanks 60, in fluid communication with a control valve and metering apparatus 62 of known construction, which properly regulates the flow of solvent material from the tanks to each dispenser of the pairs of dispensers 32 and 32a through the connecting tubes 63.

Bonding of the microporous PVC sheet material 53 and 53a, and the PVC sealing strips may be achieved by using a solvent material, which may be a solvent such as tetrahydrofuran, commercially known as THF, and which is a solvent for natural and synthetic resins, particularly vinyls, or a PVC solvent cement which contains approximately 5% to 10% solids with a mixture of solvents, including THF.

Figure 3:
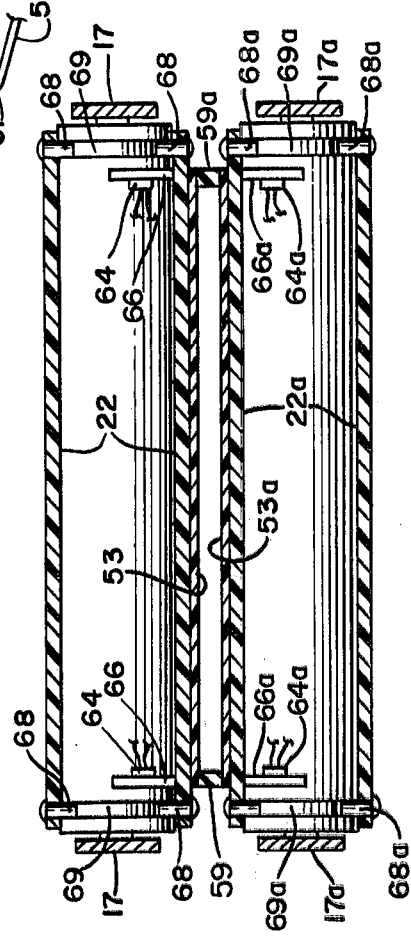
FIG. 3 is a cross-sectional view taken along line 3—3 of FIG. 1, showing the formed battery separator sleeve passing between two pressure-applying conveyor belts and heating elements.

As seen more clearly in FIG. 3, each of the belt assemblies 17 and 17a are provided along the lateral edges with a source of controlled heat. A plurality of heaters 64 are appropriately supported by means (not shown) on the belt frame 18 and are positioned adjacent to the lateral edges of the upper belt 22. Each of the heaters 64 may be of known construction, such as a chromolux heater, which is thermostatically controlled by a thermostat 64b (FIG. 1), and is available in convenient lengths. For example, a set of two, separate heaters 64 may be provided along the entire length of each edge of the belt 22. Each of the heaters 64 is spaced away from the inside surface of the belt 22, and is attached to a heat-transmitting bar 66 made of a suitable material, such as brass. One end of the heat-transmitting bar 66 is in direct, rubbing contact with the inside surface of the belt 22. Brass is an ideal material for the heat-transmitting bar 66 since it is a good thermal conductor, and can be highly polished to minimize the friction and wear on the belt 22 as the belt passes over the bar. Similarly, the belt 22a of the lower belt assembly 17a is provided with a series of heaters 64a and heat-transmitting bars 66a, which are structurally and functionally similar, respectively, to the heaters 64 and the heat-transmitting bars 66 described for the upper belt 22. While not specifically shown in the drawings, it is understood that the heaters 64 and 64a will be connected to an appropriate source of electrical energy, with the thermostats 64a regulating the heat output within the temperature range of approximately 150°–250° F. Being rigidly supported by the belt frames 18 and 18a, the heat-transmitting bars 66 and 66a are in intimate contact with the belts 22 and 22a along their length as the fabricated battery envelope sleeve moves between the belts.

Also visible in FIG. 3 is a series of short studs 68 and 68a, eight of which are shown in the figure, which protrude to the inside surface of the upper and lower belts 22 and 22a, respectively, along the lateral edges of the belts and outwardly of the heaters 64 and 64a. The series of studs 68 and 68a are designed to mesh with grooves 69 and 69a provided on the end portions of the rollers 19 and 19a, respectively, over which the respective upper and lower belts 22 and 22a are tracked. This ensures a positive, guided, non-slip drive for the belts 22 and 22a.

The endless belts 22 and 22a may be of a suitable type and construction. A particularly suitable type is a very thin belt of fiberglass-reinforced construction, with a thickness of approximately 0.017–0.018 inches, and coated with a layer of material which provides a good frictional surface to move the microporous plastic sheet material, is chemically resistant to the solvent material used in the fabrication process, and possesses good heat transfer characteristics. A suitable coating material is a fluorocarbon resin, such as polytetrafluoroethylene (TFE) or fluorinated ethylene-propylene (FEP) marketed under the trade name of "Teflon".

Figure 4:
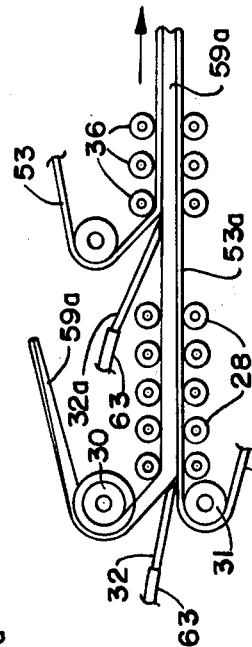
FIG. 4 is a fragmentary view, to an enlarged scale, of the solvent dispensers incorporated into the fabricating apparatus of FIG. 1.

FIG. 4 shows, in a fragmentary fashion, the positioning of the plastic sealing strip 59a along the edges of the microporous plastic materials 53a and 53 and the orientation of the pairs of dispensers 32 and 32a. The pairs of dispensers 32 and 32a may be small-bore (0.020–0.050 inches inside diameter), hypodermic-type needles, which have the dispensing ends ground at an angle. The ground end of each dispenser in the pair of dispensers 32 provides a flat surface which is in contact with the lower surface of the sealing strips 59 and 59a, with the ground end of each dispenser of the pair of dispensers 32a in contact with the upper surfaces of the plastic sealing strips. Movement of the sealing strips 59 and 59a past the ground ends of the pairs of dispensers 32 and 32a provides a controlled quantity of solvent material directly on both surfaces of the sealing strips from the control valve and metering apparatus 62, which in turn wets the corresponding lateral edges of the lower and upper microporous plastic materials 53a and 53.

In operation, the supply spools 52 and 52a of microporous plastic material are mounted, respectively, on the upper and lower shafts 51 and 51a, with the lengths of the microporous plastic material 53 and 53a passing over the series of guide rollers 54, 55, 34 and 31, in the fashion described above. The spools 58 and 58a of plastic sealing strips are mounted on the spindles 56 and 56a, respectively, with the sealing strips 59 and 59a passing over the pair of grooved guide rollers 30, which rotate each strip 90° so that the greater dimensions, i.e., 4.8 mm., is disposed vertically with respect to the surface of the sheet material 53a, and position each strip properly along the lateral edge of the sheet material 53a (note FIG. 3).

The lower sheet of microporous plastic material 53a and the properly-positioned sealing strips 59 and 59a are supplied to the first series of pressure rollers 28, and just as the leading ends of these elements enter the pressure rollers, a controlled quantity of solvent material from one of the solvent tanks 60 is supplied to the first pair of dispensers 32 by the control valve and metering apparatus 62 through the connecting tubes 63. The solvent material is supplied to the interfaces between the upper surface of the lower microporous plastic material 53a and the lower surfaces of the two sealing strips 59 and 59a, and may be dispensed directly onto the lower surface of the sealing strip 59a (FIG. 4). As this is done, the lower microporous plastic material 53a and the plastic sealing strips 59 and 59a are immediately placed under pressure by passage through the first set of pressure rollers 28, to bond the plastic sealing strips to the lower microporous plastic material as forward motion of the assembled materials continues.

The upper microporous plastic material 53, guided by the roller 34, comes into superposed alignment with the plastic sealing strips 59 and 59a, with the lateral edges of the microporous plastic material being vertically aligned with the outer edges of the plastic sealing strips. Solvent material is placed in the interfaces between the lower surface of the lateral edges of the upper microporous plastic material 53 and the upper surfaces of the plastic sealing strips 59 and 59a by the second pair of dispensers 32a, directly on the upper surfaces of the plastic sealing strips. The amount of solvent material supplied by the pairs of dispensers 32 and 32a is precisely controlled and metered to maintain exact bonding action between the microporous plastic materials 53 and 53a and the plastic sealing strips 59 and 59a. The contents of each of the solvent tanks 60 may be metered by the control valve and metering apparatus 62 to the respective pairs of dispensers 32 and 32a.

As forward motion continues, the assembled battery separator sleeve passes through the second set of pressure rollers 36, which initiates the bonding action between the upper microporous plastic material 53 and the upper surfaces of the plastic sealing strips 59 and 59a. The assembled battery separator sleeve is then passed between the belts 22 and 22a (FIG. 3), where additional pressure is applied to the upper and lower sheets 53 and 53a, respectively, to complete the bonding of all components.

Passage of the formed battery separator sleeve between the belts 22 and 22a also places the lateral edges of the separator sleeve in contact with the heat transferred to the lateral edges of the belts by the heaters 64 and 64a, and the heat-transmitting bars 66 and 66a. The heat-transmitting bars 66 and 66a transfer heat to the bonded interfaces of all components to speed the adhesive reaction of the solvent material, and to dry any excess solvent material.

Continued motion of the belts 22 and 22a moves the fabricated battery separator sleeve into and through the rotary cutter bed 38 and the rotary cutter 40, and onto the conveyor belt 45, where it encounters and trips the microswitch 46, which signals and activates the cutter 40 to cut a length of the sleeve. Continued forward motion of the fabricated battery separator sleeve pushes the cut section of the sleeve off the belt 45, into a suitable collecting container (not shown) positioned below the end of the belt. The length of fabricated sleeve cut is adjustable to suit a multiple of lengths of a required, battery envelope sleeve. For example, a 1269 mm. (50 inch) length of fabricated sleeve will make five battery envelope sleeves 252 mm. (9-15/16 inches) long.

As the supply of microporous plastic material or plastic sealing strips is exhausted, the empty spools 52 and 52a, or 58 and 58a, are removed and replaced with new spools of material. Threading of the materials through the apparatus 10 is repeated as described above.

Although every detail has not been particularly described in the drawings, it is understood that all of the components described are arranged and supported in an appropriate fashion to form a complete and operative system. Further, it is understood that all of the components in the overall system have not been specifically described, but that such components are known and will be appropriately incorporated into the operative system.

Of course, variations of the specific construction and arrangement of the battery separator sleeve forming apparatus disclosed above can be made by those skilled in the art without departing from the invention as defined in the appended claims.

What is claimed is:

1. An apparatus for the fabrication of battery separator sleeves, comprising:
   a supply source of a microporous plastic sheet material;
   a supply source of a plastic sealing strip, said plastic sealing strip having a transverse cross-sectional shape characterized by a major dimension greater than a minor dimension;
   means for positioning said sealing strip along one lateral edge of said sheet material with the minor dimension of said transverse cross-sectional shape being parallel to the surface of said sheet and the major dimension of said cross-sectional shape extending perpendicular to said sheet;

means for dispensing a bonding material into the interface between said sealing strip and said sheet material; and means for applying pressure to the separator sleeve defined by the assembly of said sheet material and said sealing strip to initiate bonding of said assembly by the bonding material and to accurately locate said sealing strip along said lateral edge of said sheet material.

2. The apparatus of claim 1, wherein said means for applying pressure to the separator sleeve assembly includes a set of pressure rollers positioned substantially immediately adjacent to said means for positioning said sealing strip apply pressure to the assembly of said sheet material and said sealing strip.

3. The apparatus of claim 2, wherein said means for applying pressure to the separator sleeve assembly further includes:

a lower, movable belt assembly disposed below said sheet material;

an upper, movable belt assembly disposed above said sheet material and superposed above said lower belt assembly; and means for propelling the separator sleeve assembly between said lower and upper belt assemblies, said upper and lower belts being spaced from each other a distance sufficient to permit passage of said sealing strip and sheet material while applying bonding pressure between said sealing strip and sheet material.

4. The apparatus of claim 3, wherein said upper belt assembly is provided with means to pivotally support one end for adjustment of the separation between said lower and upper belt assemblies.

5. The apparatus of claim 3, wherein each of said lower and upper belt assemblies comprises:

an elongated support frame;

roller means supported for rotation at the ends of said support frame; and an endless belt disposed over said roller means.

6. The apparatus of claim 5, wherein each of said lower and upper belt assemblies further includes:

a plurality of protruding engagement elements spaced along the edges of said endless belt; and annular recesses disposed adjacent to the end portions of said roller means for receiving said protruding engagement elements, said engagement elements and said recesses cooperating to provide non-slip movement of said endless belt.

7. The apparatus of claim 3, wherein each of said lower and upper belt assemblies includes a thin, endless belt of reinforced construction and provided with a coating of a heat-transmitting, chemically-resistant, and non-slip material.

8. The apparatus of claim 7, wherein said endless belt is of fiberglass-reinforced construction, and said coating is a flurocarbon resin.

9. The apparatus of claim 1, wherein said means for dispensing a bonding material includes:

storage means for containment of the bonding material;

control means coupled to said storage means for controlling the flow of bonding material from said storage means; and a dispenser connected to said control means and positioned to provide bonding material to the interface between said sheet material and said sealing strip.

10. The apparatus of claim 9, wherein said dispenser includes a dispensing member positioned to apply bonding material along the surface of said sealing strip which contacts a lateral edge of said sheet material.

11. The apparatus of claim 1, wherein said bonding material is a solvent.

12. The apparatus of claim 1, wherein said bonding material is a solvent cement.

13. The apparatus of claim 3, further including heating means adapted to apply heat to the lateral edge of said sheet material having said sealing strip.

14. The apparatus of claim 13, wherein said heating means includes:

a heating element disposed in vertical, spaced relationship to a lateral edge of said lower and upper movable belt assemblies; and a heat-transfer element associated with and in thermal contact with said heating element, and in physical contact with the lateral edges of said belt assemblies between which said sealing strip and said sheet material pass.

15. The apparatus of claim 1, wherein said apparatus further includes cutter means to cut the bonded separator sleeve assembly into predetermined lengths.

16. The apparatus of claim 1, wherein said microporous plastic sheet material comprises microporous polyvinyl chloride sheet, and said plastic sealing strip comprises extruded polyvinyl chloride strip.

17. The apparatus of claim 1, wherein said sheet material comprises a continuous length of microporous plastic material wound upon a supply roll, and said sealing strip comprises a continuous length of plastic sealing strip material wound upon a supply roll, the orientation of said sealing strip on said supply roll being such that said aforesaid major dimension extends horizontally and said minor dimension extends vertically measured in a plane passing through the axis of said supply roll.

18. The apparatus of claim 1, further including:

a second supply source of a second sealing strip;

second means for positioning said second sealing strip along the other lateral edge of said sheet material; and said means for dispensing bonding material includes means for dispensing bonding material into the interface between said sheet material and said second sealing strip.

19. The apparatus of claim 1, further including:

a second supply source of a second microporous plastic sheet material;

second means for positioning said second sheet material in superposed orientation with respect to said sheet material, one of the lateral edges of said second sheet material being aligned with said sealing strip after initial bonding of said sealing strip to said first sheet material;

said bonding material dispensing means includes means for dispensing bonding material into the interface between said sealing strip and second sheet material; and second pressure application means located substantially immediately adjacent to said second positioning means to initiate bonding of said second sheet to said sealing strip.

20. An apparatus for the fabrication of battery separator sleeves, comprising:

a first supply source of a first microporous plastic sheet material;

first and second supply sources of first and second plastic sealing strips, respectively, said sealing strips having a transverse cross-sectional shape characterized by a major dimension greater than a minor dimension; p1 means for positioning said first sealing strip along one lateral edge of said first sheet material and said second sealing strip along the other lateral edge of said first sheet material with the major dimension of each said sealing strip extending perpendicular to each said lateral edge;

a second supply source of a second microporous plastic sheet material;

second means for positioning said second sheet material in superposed orientation with respect to said first sheet material and for aligning the lateral edges of said second sheet material with said first and second sealing strips;

means for dispensing a bonding material into the interfaces between said first and second sealing strips and said first and second sheet materials;

means located between said positioning means and said second means for substantially immediately applying pressure to the separator sleeve defined by the assembly of said first sheet material and said first and second sealing strips to initiate bonding of said assembly by the bonding material prior to positioning of said second sheet by said second means as aforesaid; second means for applying pressure to said assembly and said second sheet to initiate bonding thereof, said second pressure applying means being located downstream with respect to said second positioning means; and cutter means to cut the bonded separator sleeve assembly into predetermined lengths.

21. The apparatus of claim 20, further including third means for applying pressure to the separator sleeve assembly, said third means comprising:

a lower, movable belt assembly disposed below said first sheet material;

an upper, movable belt assembly disposed above said second sheet material and superposed above said lower belt assembly; and means for propelling the separator sleeve assembly between said lower and upper belt assemblies, said upper and lower belts being spaced from each other a distance sufficient to permit passage of said sleeve assembly while applying bonding pressure thereto.

22. The apparatus of claim 21, further including heating means adapted to apply heat to the lateral edges of said separator sleeve assembly, said heating means comprising:

a heating element disposed in vertical, spaced relationship to each of the opposed lateral edge portions of said lower and upper movable belt assemblies; and a heat-transfer element associated with and in thermal contact with each of said heating elements, and in physical contact with the opposed lateral edge portions of said belt assemblies.

23. The apparatus of claim 20, wherein said first and second means for applying pressure to the separator sleeve assembly respectively include:

a first set of pressure rollers positioned to apply pressure to the assembly of said first sheet material and said first and second sealing strips; and a second set of pressure rollers positioned to apply pressure to the assembly of said first and second sheet materials and said first and second sealing strips disposed between said sheet materials.

24. The apparatus of claim 20, wherein said means for dispensing a bonding material includes:

storage means for containment of the bonding material;

control means coupled to said storage means for controlling the flow of bonding material from said storage means; and dispensers connected to said control means and positioned to provide bonding material to the interfaces between said first and second sheet materials and said first and second sealing strips.

25. The apparatus of claim 24, wherein said dispensers includes:

a first set of dispensing members positioned to apply bonding material along the surfaces of said first and second sealing strips which contact the lateral edges of said first sheet material; and a second set of dispensing members positioned to apply bonding material along the surface of said first and second sealing strips which contact said second sheet material.

26. The apparatus of claim 20, wherein each of said first and second sheet materials comprises a continuous length of microporous plastic material wound upon a supply roll, and each of said first and second sealing strips comprises a continuous length of plastic sealing strip material wound upon a supply roll.

* * * * *